United States Patent
Leopold (10) Patent No.: US 11,193,791 B2
(45) Date of Patent: Dec. 7, 2021

(54) OPERATIONAL FLIGHT ENVELOPE MANAGEMENT SYSTEM

(71) Applicant: The Boeing Company, Chicago, IL (US)

(72) Inventor: David Daniel Leopold, Seattle, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 16/353,557

(22) Filed: Mar. 14, 2019

(65) Prior Publication Data
US 2020/0292351 A1 Sep. 17, 2020

(51) Int. Cl.
*G01C 23/00* (2006.01)
*B64D 43/02* (2006.01)

(52) U.S. Cl.
CPC ........... *G01C 23/005* (2013.01); *B64D 43/02* (2013.01)

(58) Field of Classification Search
CPC ...... G01C 23/00; G01C 23/005; B64D 43/02; B64C 29/00; G05D 1/0607; G05D 1/0055; G05D 1/101; G05D 1/042; G08G 5/00; G08G 5/003
USPC .......................................................... 701/14
See application file for complete search history.

(56) References Cited

U.S. PATENT DOCUMENTS

| | | | |
|---|---|---|---|
| 3,362,661 A | 1/1968 | Booth et al. | |
| 6,282,466 B1 | 8/2001 | Nolte et al. | |
| 7,512,464 B2 * | 3/2009 | Tarleton | G05D 1/06 701/3 |
| 7,959,111 B1 * | 6/2011 | Dirks | G05D 1/08 244/181 |
| 9,214,087 B2 * | 12/2015 | Barral | G08G 5/0008 |
| 9,218,002 B2 * | 12/2015 | Schulte | G05D 1/0061 |
| 9,409,654 B2 * | 8/2016 | Johnson | B64D 45/00 |
| 9,483,058 B2 * | 11/2016 | Moxon | |
| 9,703,293 B2 * | 7/2017 | Leopold | G05D 1/0816 |
| 10,388,170 B2 * | 8/2019 | De Villele | G08G 5/0052 |
| 2013/0030607 A1 * | 1/2013 | Schulte | 701/2 |
| 2013/0261850 A1 * | 10/2013 | Smith | 701/3 |
| 2016/0347468 A1 * | 12/2016 | Tanguy | B64D 43/02 |
| 2017/0088284 A1 | 3/2017 | Holder | |
| 2018/0017410 A1 * | 1/2018 | Ludtke, II | G01C 23/005 |
| 2019/0127079 A1 * | 5/2019 | Ribeiro | B64D 43/02 |

FOREIGN PATENT DOCUMENTS

| EP | 0471395 A2 | 2/1992 |
|---|---|---|
| EP | 3136197 A1 | 3/2017 |

OTHER PUBLICATIONS

Extended European Search Report, dated Aug. 5, 2020, regarding Application No. 20162456.6, 7 pages.

* cited by examiner

*Primary Examiner* — Thomas G Black
*Assistant Examiner* — Anthony M Gartrelle
(74) *Attorney, Agent, or Firm* — Yee & Associates. P.C.

(57) ABSTRACT

A method, apparatus, and system for adjusting an operational flight envelope for an aircraft. An airspeed of the aircraft is received from a sensor system in the aircraft. An amount of change in the airspeed of the aircraft is determined. A current ceiling of the operational flight envelope for the aircraft is adjusted based on the amount of change in the airspeed of the aircraft.

29 Claims, 7 Drawing Sheets

OPERATIONAL FLIGHT ENVELOPE MANAGEMENT SYSTEM

BACKGROUND INFORMATION

1. Field

The present disclosure relates generally to aircraft and in particular, to a method, apparatus, and system managing the flight envelope of an aircraft using state information for the aircraft.

2. Background

A flight envelope for aircraft represents a boundary associated with a threshold for a particular function. A flight envelope can be a combination of functions that include parameters such as an airspeed, an angle of attack, and a lift coefficient. Separate flight envelopes can be associated with a stall warning versus angle of attack limiting function for the aircraft.

An operational flight envelope represents a region within which the aircraft can operate. A maximum ceiling of an operational flight envelope represents the limit (e.g., slowest speed or highest angle of attack) of the operational flight envelope. The maximum ceiling for the operational flight envelope will typically represent the more limiting (e.g., fastest speed or lowest AOA) one of the various flight envelopes that are present. For example, the maximum ceiling of the operational flight envelope may be defined by the lower limit the angle of attack envelope limit at the target airspeed or a stick shaker envelope limit.

Currently, an initial ceiling of an operational flight envelope may be set below the maximum ceiling so that when the initial ceiling is reached or exceeded, various actions can be taken before the aircraft reaches the maximum ceiling. For example, a mechanical device such as a stick shaker can be activated to migrate the control yoke of an aircraft to provide an alert to the pilot. As another example, a limit to an angle of attack can also be set to prevent further increases in addition to or in place of the stick shaker activation.

The initial ceiling of an operational flight envelope currently used may not always provide a desired level of warning for stall conditions or other performance concerns for desired safety margin and operating the aircraft. Therefore, it would be desirable to have a method and apparatus that take into account at least some of the issues discussed above, as well as other possible issues. For example, it would be desirable to have a method and apparatus that overcome a technical problem with setting a ceiling of an operational flight envelope of an aircraft with desired safety margin in operating the aircraft.

SUMMARY

An embodiment of the present disclosure provides an aircraft system comprising a computer system in an aircraft and a controller in the computer system. The controller receives an airspeed of the aircraft from a sensor system in the aircraft and determines an amount of change in the airspeed of the aircraft. The controller adjusts a current ceiling of an operational flight envelope for the aircraft based on the amount of change in the airspeed of the aircraft.

Another embodiment of the present disclosure provides an aircraft system comprising a computer system in an aircraft. The computer system determines an amount of change in an airspeed of the aircraft and adjusts an operational flight envelope for the aircraft based on the amount of change in the airspeed of the aircraft to form an adjusted operational flight envelope. The computer system adjusts a group of settings for a group of aircraft systems in the aircraft based on the adjusted operational flight envelope. The group of settings are used by the group of aircraft systems to operate the aircraft.

Yet another embodiment of the present disclosure provides a method for adjusting an operational flight envelope for an aircraft. An airspeed of the aircraft is received from a sensor system in the aircraft. An amount of change in the airspeed of the aircraft is determined. A current ceiling of the operational flight envelope for the aircraft is adjusted based on the amount of change in the airspeed of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current flight envelope protection mechanisms for setting an initial ceiling of an operational flight envelope for an aircraft with a desired level of maneuverability can use mechanisms that impede the desired level of maneuverability. For example, the illustrative embodiments recognize and take into account that assertive mechanisms such as a stall warning, an angle of attack limit, and an automatic thrust increase can impede desired maneuverability of an aircraft.

The illustrative embodiments recognize and take into account current flight envelope protection mechanisms for setting the initial ceiling of an operational flight envelope do not take into account whether the aircraft is flying at an appropriate airspeed, whether the aircraft is decreasing airspeed at an undesired rate, increasing airspeed at an undesired rate, or some other undesired situation with respect to the airspeed or the manner in which airspeed is changed for the aircraft. The illustrative embodiments also recognize and take into account that changes in the airspeed that are considered undesired can change for different maneuvers performed by the aircraft.

Further, the illustrative embodiments recognize and take account that current mechanisms for setting the initial ceiling of an operational flight envelope do not take into account the possibility that the airspeed of an aircraft may decay at a rate that causes the aircraft to approach the ceiling more quickly than anticipated or desired.

The illustrative embodiments recognize and take into account that with inadvertent decay in the airspeed, the activation of current mechanisms such as a stick shaker or angle of attack limits may be delayed longer than desired. In other words, the illustrative embodiments recognize and take into account that the current practice of setting the initial ceiling of operational flight envelopes may permit larger amounts of decay in the airspeed than desired for maintaining a desirable level of maneuverability and margin for the operational flight envelope.

Thus, the illustrative embodiments provide a method, an apparatus, and a system for adjusting an operational flight envelope for an aircraft. The adjustments are performed dynamically during the flight of an aircraft. These adjustments are performed quickly enough such that desired maneuverability and safety margins are maintained. In one illustrative example, an airspeed of the aircraft is received from a sensor system in the aircraft. An amount of change in the airspeed of the aircraft is determined. A current ceiling of the operational flight envelope for the aircraft is adjusted based on the amount of change in the airspeed of the aircraft.

Figure 1:
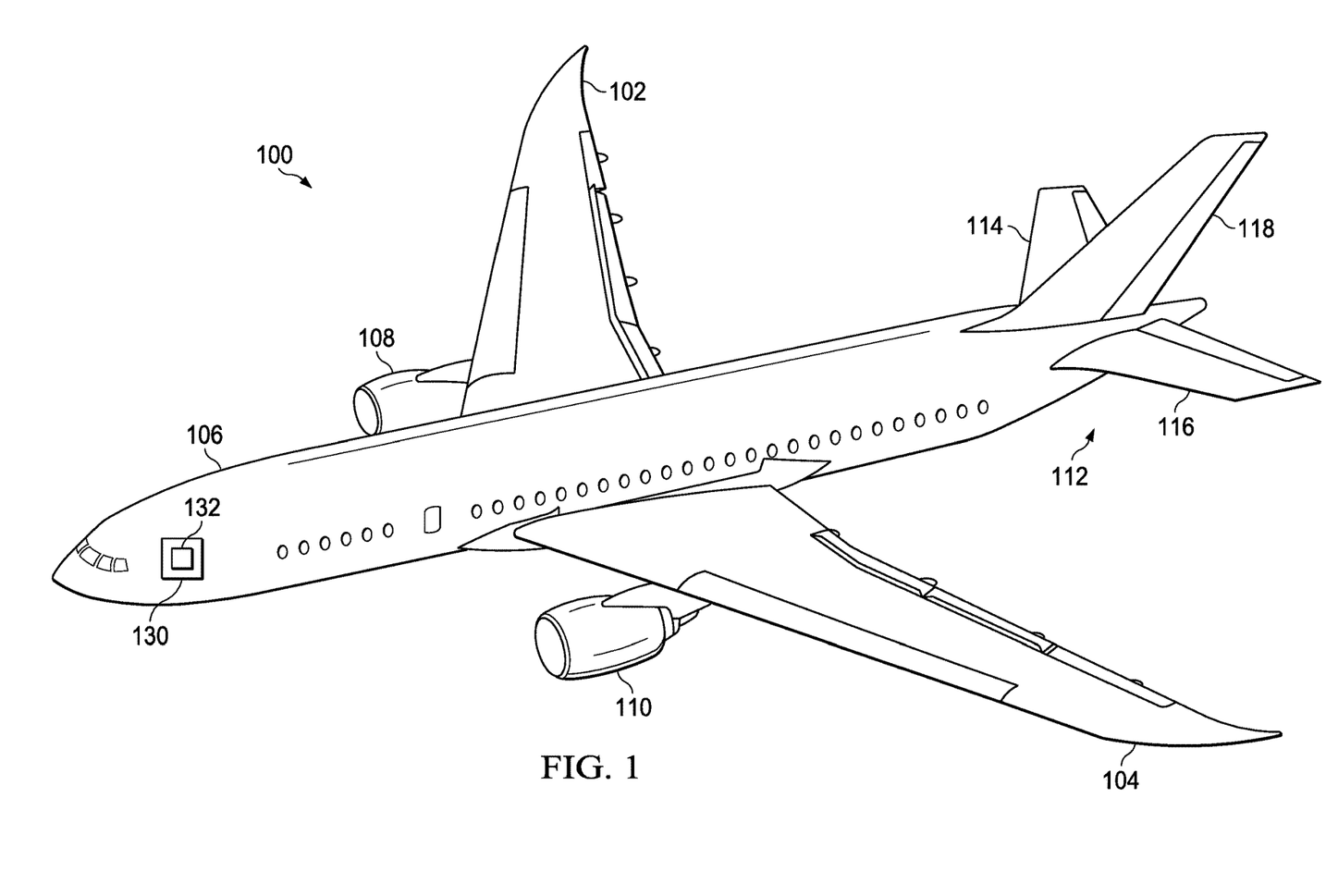
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which computer system 130 in aircraft 100 can implement at least one of a hardware component, a software component, or some combination thereof that operate to compensate for energy changes in aircraft 100. For example, computer system 130 can operate to change in operational flight envelope for aircraft 100 in response to any changes in the form of the airspeed of aircraft 100. As depicted, these processes can be implemented in a component such as crew alerting system (CAS) 132 within computer system 130.

In this illustrative example, computer system 130 dynamically changes current ceiling of the operational flight envelope for aircraft 100 during the flight of aircraft 100. Computer system 130 can change the current ceiling of the operational flight envelope to maintain at least one of a desired safety margin or desired maneuverability.

These changes to the current ceiling by computer system 130 are performed in real-time. In other words, changes to the operational flight are performed as quickly as possible without intentional delay.

Figure 2:
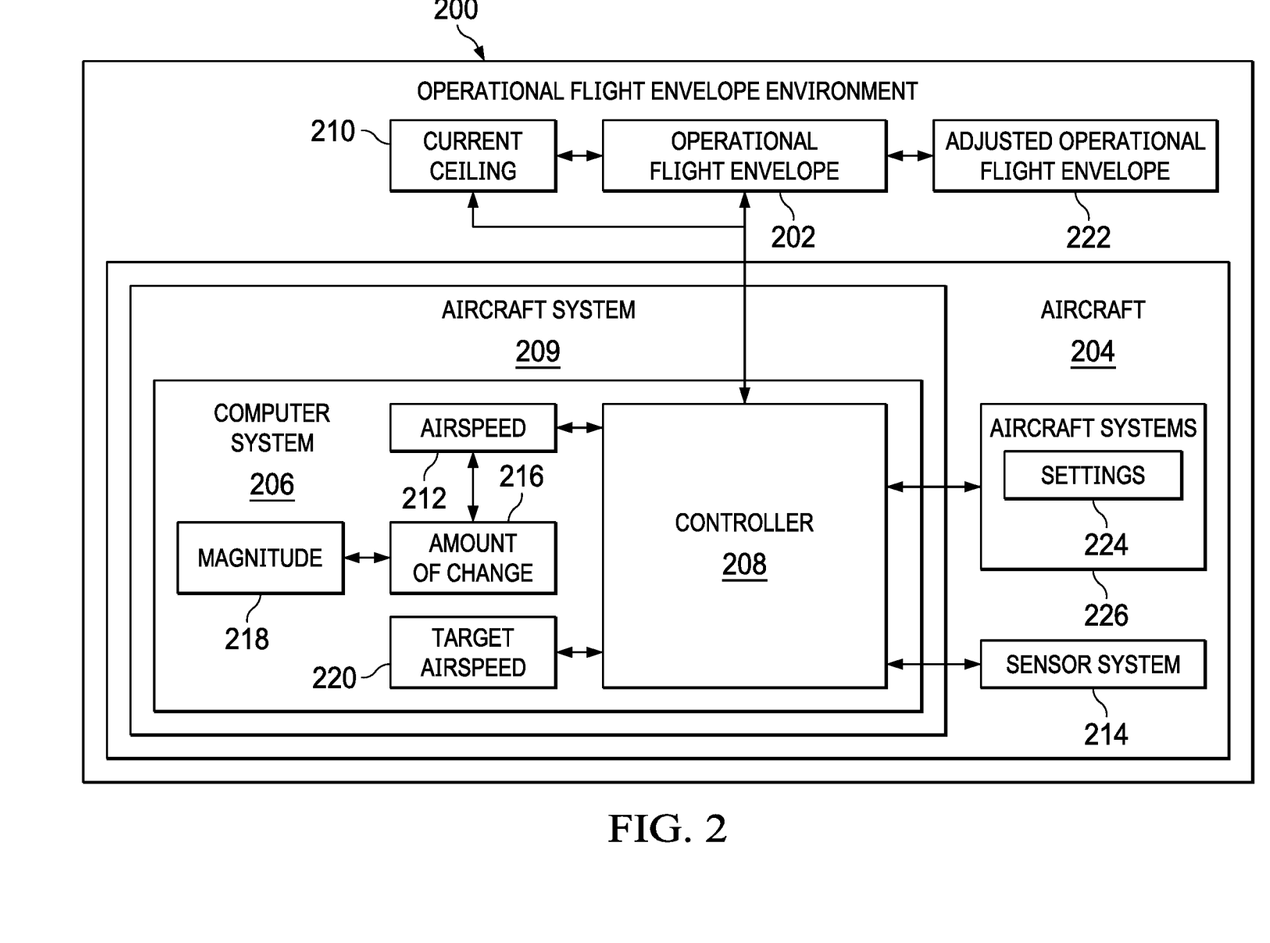
FIG. 2 is an illustration of a block diagram of an aircraft flight environment in accordance with an illustrative embodiment.

With reference next to FIG. 2, an illustration of a block diagram of an aircraft flight environment is depicted in accordance with an illustrative embodiment. In this illustrative example, operational flight envelope environment 200 is an environment in which operational flight envelope 202 can be managed for aircraft 204.

Aircraft 100 in FIG. 1 is an example of one implementation for aircraft 204. As depicted, aircraft 204 can be a commercial airplane, a rotocraft, a fixed wing aircraft, a jet aircraft, a fighter, and other suitable types of aircraft for which operational flight envelopes can be managed.

In this illustrative example, operational flight envelope 202 defines a boundary that aircraft 204 is not expected to go beyond during flight. For example, operational flight envelope 202 can be described using a threshold for parameter selected from at least one of an angle of attack, a coefficient of lift, an airspeed, or other suitable parameter for aircraft 204. For example, the threshold can be a maximum value for an angle of attack or a coefficient of lift. As another example, the threshold can be a minimum value for airspeed or a maximum value for a load factor (Nz).

As depicted, operational flight envelope 202 can be managed by computer system 206 in aircraft 204. For example, controller 208 in computer system 206 can include processes for managing operational flight envelope 202 for aircraft 204. Computer system 206 with controller 208 form aircraft system 209.

In this illustrative example, computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a laptop computer, a tablet computer, an electronic flight bag, or some other suitable data processing system.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Controller 208 can be present in one or more different locations within computer system 206. For example, controller 208 can be located in a computer or other hardware selected from a group comprising a crew alerting system, a stall warning system, a flight control system, or other suitable system within computer system 206.

Controller 208 can be implemented in software, hardware, firmware or a combination thereof. When software is used, the operations performed by controller 208 can be implemented in program code configured to run on hardware, such as a processor unit. When firmware is used, the operations performed by controller 208 can be implemented in program code and data and stored in persistent memory to run on a processor unit. When hardware is employed, the hardware can include circuits that operate to perform the operations in controller 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Used herein, a "number of" when used with reference to items means one or more items. For example, a number of operations is one or more operations.

In this illustrative example, controller 208 operates to control operational flight envelope 202 for aircraft 204 during flight of aircraft 204. Controller 208 can select current ceiling 210 of operational flight envelope 202. In this illustrative example, controller 208 selects current ceiling 210 of operational flight envelope 202 to have a desired level of maneuver capability at target airspeed 220. Controller 208 can dynamically adjust current ceiling 210 of operational flight envelope 202 selected for aircraft 204 during the flight of aircraft 204.

As depicted, controller 208 in computer system 206 receives airspeed 212 of aircraft 204 from sensor system 214 in aircraft 204. In this illustrative example, sensor system 214 is a physical hardware system in aircraft 204. Sensor system 214 includes a number of different types of sensors that detect or calculate various parameters about aircraft 204. As depicted, flap configuration, a target airspeed, an angle of attack, a lift coefficient or other data can be received from the sensor system 214 in aircraft 204. As yet another example, airspeed 212 can be received from sensor system 214. Sensor system 214 can determine airspeed 212 from data collected from sensors.

For example, sensor system 214 can include a group of pitot probes or pitot tubes that measure stagnation and total pressure of air, which is also referred to as pitot pressure. This measured stagnation pressure can be used in Bernoulli's equation to identify a flow velocity, which is airspeed 212.

As used herein, a "group of" when used with reference to items means one or more items. For example, a group of pitot tubes is one or more pitot tubes.

In the illustrative example, controller 208 determines amount of change 216 in airspeed 212 of aircraft 204. In determining amount of change 216 in the airspeed 212 of aircraft 204, controller 208 can determine magnitude 218 of amount of change 216 in airspeed 212 of aircraft 204 using airspeed 212 and target airspeed 220 for aircraft 204 in one illustrative example. In other illustrative examples, amount of change 216 can be determined by comparing airspeed 212 received from sensor system 214 to prior airspeeds received from sensor system 214.

As depicted, controller 208 adjusts operational flight envelope 202 for aircraft 204 based on amount of change 216 in airspeed 212 of aircraft 204 to form adjusted operational flight envelope 222. In this illustrative example, controller 208 adjusts operational flight envelope 202 by adjusting current ceiling 210 of operational flight envelope 202 for aircraft 204 based on amount of change 216 in airspeed 212 of aircraft 204.

In this example, controller 208 can determine that an adjustment to current ceiling 210 of operational flight envelope 202 is needed when airspeed 212 decreases below a selected Mach. The selected Mach is a ratio of target airspeed 220 to a speed of sound. In this example, target airspeed 220 can be selected by settings identifier 308 as described in FIG. 3.

As depicted, controller 208 controls an operation of aircraft 204 using current ceiling 210 of operational flight envelope 202. In the illustrative example, operational flight envelope 202 is also referred to as adjusted operational flight envelope 222.

In the illustrative example, in controlling operation of aircraft 204 using current ceiling 210 of operational flight envelope 202, controller 208 adjusts a group of settings 224 for a group of aircraft systems 226 in aircraft 204 based on current ceiling 210 of operational flight envelope 202. The group of settings 224 is used by the group of aircraft systems 226 in operating aircraft 204. The group of aircraft systems 226 can be selected from at least one of a stall warning system, a flight control system, or some other suitable system.

In controlling the operation of aircraft 204 using current ceiling 210 of operational flight envelope 202, controller 208 sets a setting for at least one of an automatic thrust trigger, a stick shaker setting, or an angle of attack limit, or other parameter for aircraft systems 226 using current ceiling 210 of operational flight envelope 202 to control operation of aircraft 204. As depicted in this illustrative example, the control of the operation of aircraft 204 can be direct or indirect.

For example, controller 208 can control a group of settings 224 for aircraft systems 226. For example, a stick shaker setting for a stick shaker device can be set to alert for a pilot to influence the actions of a pilot in operating aircraft 204. In another illustrative example, the control of the group of settings 224 can include setting an angle of attack limit for a flight control surface system for aircraft 204 or automatic thrust trigger for an engine for aircraft 204.

Figure 3:
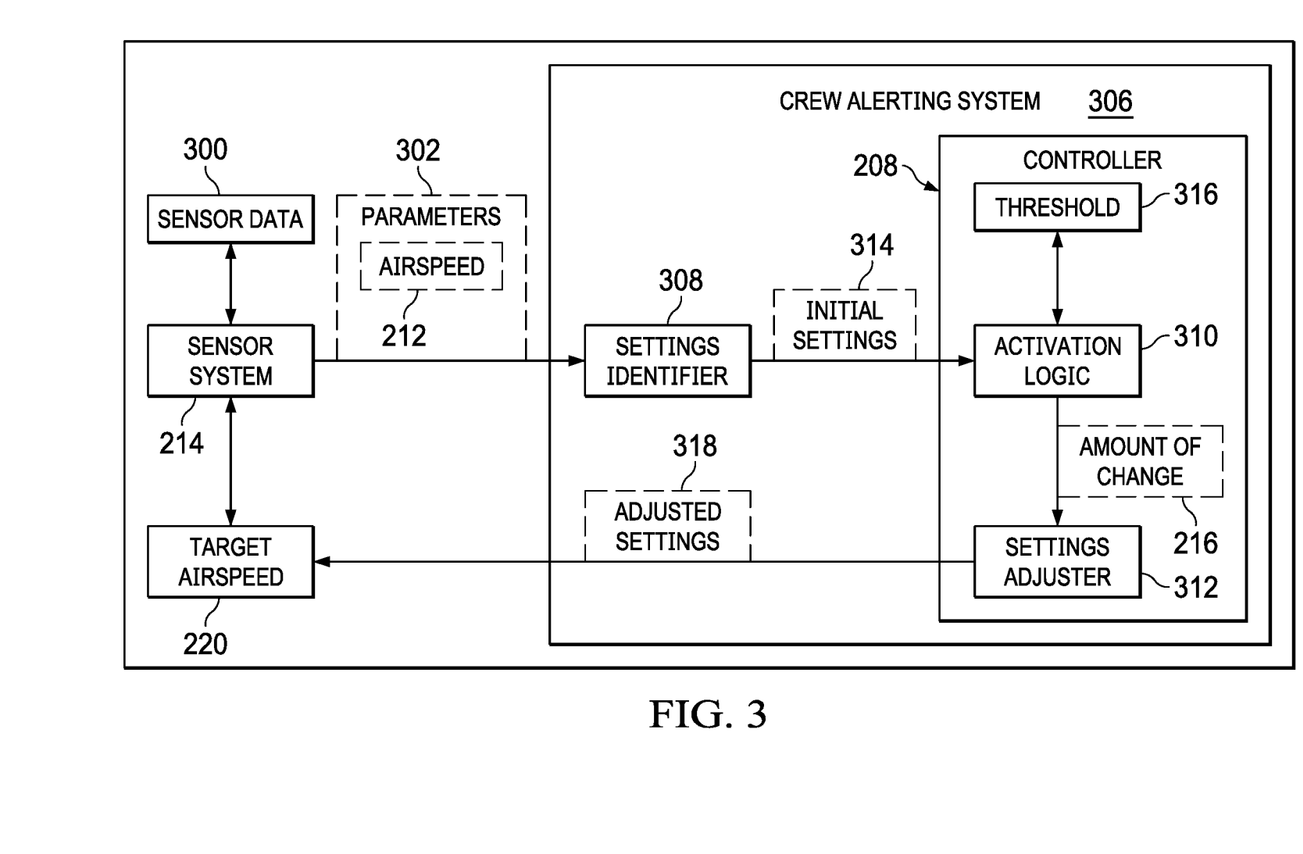
FIG. 3 is an illustration of data flow for adjusting a current ceiling of flight envelope accordance with an illustrative embodiment.

With reference next to FIG. 3, an illustration of data flow for adjusting a current ceiling of flight envelope is depicted in accordance with an illustrative embodiment. In the illustrative examples, the same reference numeral may be used in more than one figure. This reuse of a reference numeral in different figures represents the same element in the different figures.

As depicted, sensor system 214 generates sensor data 300 describing parameters 302 for the state of aircraft 204. For example, sensor system 214 generates sensor data 300 for aircraft systems 226. The sensor data 300 can be parameters 302 or can be used to calculate parameters 302. In this illustrative example, aircraft systems 226 can also include a surface control system, a propulsion system, an environmental system, and other systems in addition to a stall warning system, a flight control system, and other electronic systems, mechanical systems, and fluid flow systems that are present in aircraft 204.

As depicted, parameters 302 includes airspeed 212. Parameters 302 can also include at least one of flap configuration, angle of attack, altitude, temperature, attitude, or other suitable parameters for use by crew alerting system 306.

In this illustrative example, parameters 302 are sent to crew alerting system (CAS) 306 from sensor system 214. Crew alerting system 306 is located in computer system 206 in FIG. 2.

As depicted, crew alerting system 306 includes a number of different components. In this example, crew alerting system 306 comprises settings identifier 308, activation logic 310, and settings adjuster 312.

Settings identifier 308 implements currently available processes for setting parameters for operational flight envelopes. Settings identifier 308 calculates initial settings 314 for current ceiling 210 of operational flight envelope 202.

These initial settings can be selected from at least one of a stick shaker setting, an automatic thrust trigger, an angle of attack limit, or other settings for aircraft systems 226 in aircraft 204. Another setting can be, for example, an audio setting for an audio alert or a light setting for a visual alert that current ceiling 210 of operational flight envelop 202 has been reached.

In the illustrative example, current ceiling 210 can be initially set based on the Mach for aircraft 204. For each Mach, a corresponding value is present that has a desired margin to the relevant hazard, such as an angle of attack separation between the stick shaker setting and the angle of attack associated with stall, CLmax, loss of control, or other parameters. This selection of settings for parameters is performed without taking into account the target airspeed in settings identifier 308. The settings for these parameters are located in a table that is accessed by settings identifier 308.

Settings for target airspeed 220 is selected by settings identifier 308 (typically a function of gross weight, altitude, and center of gravity) and a check is performed to ensure that target airspeed 220 provides sufficient maneuver capability. The illustrative embodiments recognize and take into account that an issue with this current technique used in settings identifier 308 is that, for example, the initial ceiling increases as airspeed decays relative to the target airspeed which effectively permits the aircraft to decay more airspeed than necessary.

As depicted, initial settings 314 initially defines current ceiling 210 of operational flight envelope 202. For example, initial settings 314 are present for different configurations of aircraft 204 and are obtained from tables accessed by settings identifier 308. For example, a table of initial settings 314 for a current ceiling is present for a landing configuration, another table of initial settings 314 for the current ceiling is present for a takeoff configuration for aircraft 204.

Settings identifier 308 selects initial settings 314 for current ceiling 210 of operation flight envelope 202 based on the configuration. Setting adjuster 312 can adjust or change initial settings 314 to change current ceiling 210, the airspeed 212 measured for aircraft 204, and corresponding Mach number. As a result, initial settings 314 can be modified when aircraft 304 flies below target airspeed 220 by more than some desired amount.

In this illustrative example, activation logic 310 and settings adjuster 312 are examples of components in controller 208. These components operate to determine if a change is needed to current ceiling 210, adjust current ceiling 210, and determine changes to initial settings 314 if an adjustment is needed to current ceiling 210.

As depicted, activation logic 310 receives airspeed 212 from settings adjuster 312 and determines whether a change is needed in current ceiling 210 of operational flight envelope 202. This determination can be made by comparing airspeed 212 with target airspeed 220.

In the illustrative example, if amount of change 216 between airspeed 212 and target airspeed 220 is greater than threshold 316, then activation logic 310 determines the change in airspeed 212 is too great to use current ceiling 210 of operational flight envelope 202 without adjustments. In this illustrative example, amount of change 216 can be magnitude 218 from the difference between airspeed 212 and target airspeed 220.

As depicted, amount of change 216 is sent to settings adjuster 312 for use in generating adjusted settings 318. In response to receiving amount of change 216, settings adjuster 312 identifies a system bias. In this illustrative example, the system bias is a change to current ceiling 210 for operational flight envelope 202. For example, the system bias can be used to lower or raise current ceiling 210 that is initially set by settings identifier 308.

In the illustrative example, determination of the system bias by settings adjuster 312 can include defining a maximum value of change that is desired, for example 2 degrees. This maximum value can be scaled linearly or proportionally based on the amount of change 216 in airspeed 212. In the illustrative example, amount of change 216 is reduction in airspeed 212 when compared to target airspeed 220.

With this methodology, a smaller system bias is obtained for current ceiling 210 when amount of change 216 in airspeed 212 is smaller as compared to a larger system bias when amount of change 216 in airspeed 212 is larger. In other words, as the airspeed decay increases, amount of change 216 that is identified for the system bias increases up to the maximum value of 2 degrees in this example.

For example, current ceiling 210 can be a 15 degree angle of attack for the configuration of aircraft 204 and for a particular Mach number. With current ceiling 210 being 15 degrees, the initial settings identifier 308 can set an initial stick shaker setting for a stick shaker device based on a 15 degree angle of attack identified for current ceiling 210.

In this depicted example, settings adjuster 312 can determine the system bias for the change to current ceiling 210 for operational flight envelope 202 based on amount of change 216 to airspeed 212. For example, system bias can be −2.0 degrees for the angle attack at the particular Mach number. In other words, current ceiling 210 changes from 15 degrees to 13 degrees at the particular Mach number.

Settings adjuster 312 determines changes to one of more of initial settings 314 calculated by settings identifier 308 to form adjusted settings 318. Adjusted settings 318 can include changes to all initial settings. In some illustrative examples, adjusted settings 318 can include some initial settings that remain unchanged.

For example, aircraft systems 226 can include a stick shaker device and adjusted settings 318 can include a stick shaker setting used to set when a stick shaker device in aircraft systems 226 is activated. The stick shaker setting can be adjusted to activate the stick shaker device when an angle of attack of 13 degrees is reached rather than the original 15 degrees.

In this illustrative example, the change to a stick shaker setting can be determined in a number of different ways. For example, $\Delta\alpha_{IAS}$ is the inadvertent air speed bias:

$$\Delta \alpha'_{IAS} = K\left(\frac{V_{CAS} - V_{BUG}}{V_{SS0} - V_{BUG}}\right)$$

wherein K is 2 (TBD degrees bias; represents the maximum value for adjusting the initial setting setting), $V_{CAS}$ is airspeed 212; $V_{ss0}$ is initial settings 314 for the projected stick shaker speed without $\Delta \alpha_{IAS}$ (i.e., this setting is where stick shaker would normally activate); and $V_{BUG}$ knots of calibrated airspeed for target airspeed 220.

Settings adjuster 312 sends adjusted settings 318 to aircraft systems 226. In another illustrative example, aircraft systems 226 includes a flight control surface system, and adjusted settings 318 includes an angle attack limit which is used to set limits for the flight control surfaces in the flight control surface system to implement the angle of attack limits for current ceiling 210.

In the depicted example, a feedback loop is present for adjusting current ceiling 210 of operational flight envelope 202. These adjustments for biasing of current ceiling 210 can be performed dynamically during the flight of aircraft 204 in a manner that increases the safety margin for operating aircraft 204 during different maneuvers. The maneuvers can include a turn, a climb, a descent, a steep turn, a banked turn, and other maneuvers. These maneuvers can be performed at a constant airspeed or Mach or with changes in airspeed or Mach. These adjustments can be performed dynamically during the flight of aircraft 204 in a manner maintaining a desired level of maneuverability in addition to providing a desired safety margin for operating aircraft 204 during different maneuvers.

In the illustrative examples, the adjustment to current ceiling 210 can be performed dynamically in response to receiving parameters 302 from sensor system 214 in which parameters 302 include airspeed 212 of the aircraft. With airspeed 212 of aircraft 204, undesired changes or unanticipated changes in airspeed 204 can be detected and take into account by biasing or adjusting current ceiling 210 of operational flight envelope 202 for aircraft 204. As result, settings such as a stick shaker setting, an angle of attack limit, an automatic thrust trigger, or other settings for safety mechanisms can be adjusted to increase the margin of safety for aircraft 204.

In one illustrative example, one or more technical solutions are present that overcome a technical problem with setting a current ceiling of an operational flight envelope of an aircraft for desired safety margin and operating an aircraft. As a result, one or more technical solutions in the illustrative examples can provide a technical effect enabling biasing or changing the current ceiling of the operational flight envelope during the flight of the aircraft to take into account changes in airspeed.

Further, the illustrative examples provide one or more technical solutions in which the current ceiling is dynamically changed as information is received indicating changes to the airspeed of the aircraft. In this manner, undesired changes, such as inadvertent airspeed decay, can be automatically managed by a controller changing the current ceiling of operational flight envelope. One or more technical solutions can adjust settings for aircraft systems based on the change to current ceiling of the operational flight envelope. As result, one or more technical solutions in the illustrative examples can increase the safety margin in operating the aircraft.

In the illustrative example, computer system 206 can be configured to perform at least one of the steps, operations, or actions described in the different illustrative examples using software, hardware, firmware or a combination thereof. As a result, computer system 206 operates as a special purpose computer system in which controller 208 in computer system 206 enables dynamically changing a current ceiling of an operational flight envelope for aircraft in response to an amount of change in the airspeed of the aircraft during the flight of the aircraft. The change in the current ceiling can be used to dynamically adjust settings for aircraft systems during the flight of the aircraft to increase safety margins for operating aircraft. In particular, controller 208 transforms computer system 206 into a special purpose computer system as compared to currently available general computer systems that do not have controller 208.

In the illustrative example, the use of controller 208 in computer system 206 integrates processes into a practical application for method adjusting an operational flight envelope for an aircraft in a manner that increases the performance of computer system 206 by enabling computer system 206 to change a current ceiling of an operational flight envelope for the aircraft in response to an amount of change in airspeed of the aircraft. In other words, controller 208 in computer system 206 is directed to a practical application of processes integrated into controller 208 in computer system 206 that receives an airspeed of the aircraft from a sensor system in the aircraft; determines an amount of change in the airspeed of the aircraft; and adjusts current ceiling of the operational flight envelope for the aircraft based on the amount of change in the airspeed of the aircraft. In this manner, controller 208 in computer system provides a practical application of a process for adjusting current ceiling of operational flight envelope such that the functioning of computer system 206 in aircraft 204 has improved safety margins.

The illustration of operational flight in the operational flight envelope environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the operations performed by controller 208 can be implemented in separate components within controller 208. In one example an activation logic in controller 208 determines amount of change 216 in airspeed 212 of aircraft 204, and a settings adjuster in controller 208 adjusts current ceiling 210 of operational flight envelope 202 for aircraft 204 based on amount of change 216 in airspeed 212 of aircraft 204.

As another example, although activation logic 310 determines whether a change is needed to current ceiling 210 based on amount of change 216 in airspeed 212 in the form of a difference between airspeed 212 of aircraft 204 and target airspeed 220 for aircraft 204, amount of change 216 in airspeed 212 can take other forms. In yet another example, airspeed 212 can be received from a source outside of aircraft 204. For example, airspeed 212 can be received from a satellite, a radar ground station, or some other source external from aircraft 204.

Figure 4:
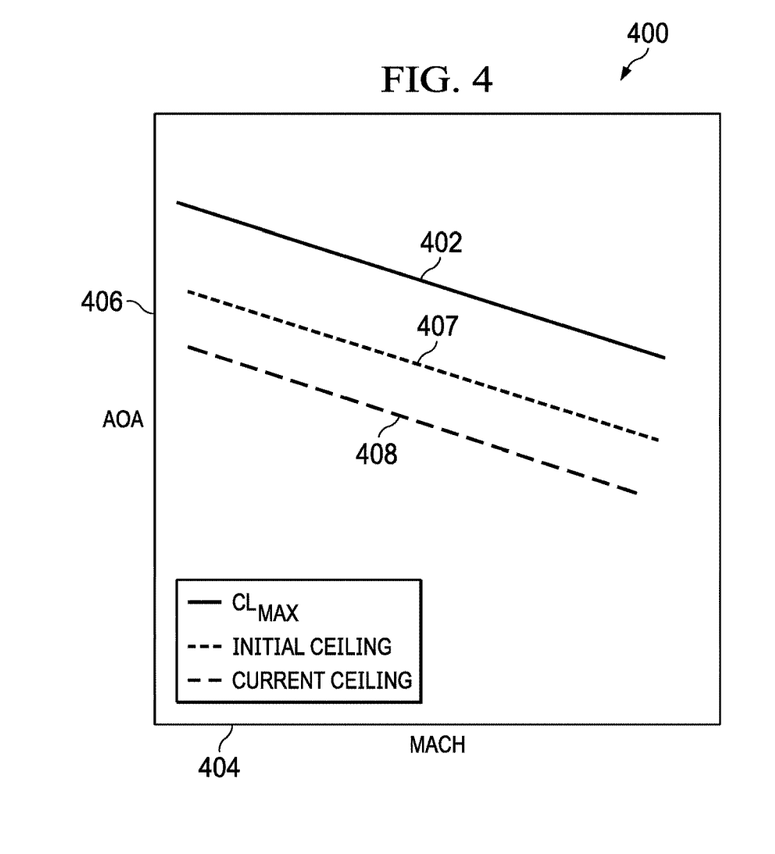
FIG. 4 is an illustration of a graph of an operational flight envelope in accordance with an illustrative embodiment.

With reference next to FIG. 4, an illustration of a graph of an operational flight envelope is depicted in accordance with an illustrative embodiment. In this illustrative example, graph 400 illustrates an operational flight envelope, such as operational flight envelope 202 in FIG. 2.

In this illustrative example, maximum coefficient of lift ($CL_{MAX}$) curve 402 that defines the maximum ceiling of the operational flight envelope. As depicted, maximum coefficient of lift curve 402 defines the maximum coefficient of lift with respect to Mach on x-axis 404 and angle of attack (AOA) on y-axis 406. Different aircraft will have different maximum coefficient of lift curves.

The region above maximum coefficient of lift curve 402 is a region in which undesired operating conditions can be present for the aircraft. These conditions can involve unpredictable or undesired maneuverability or control for an aircraft with a particular configuration.

In this illustrative example, initial ceiling 407 is determined by settings identifier 308 in controller 208 in FIG. 3. As the state of the aircraft and in particular the airspeed of the aircraft changes during the flight of the aircraft, initial ceiling 407 can be changed.

For example, when the change in the airspeed of the aircraft is greater than some desired level, initial ceiling 407 can be adjusted to current ceiling 408. In this illustrative example, the change to initial ceiling 407 of the flight envelope can be determined by settings adjuster 312 in controller 208 in FIG. 3.

In this illustrative example, current ceiling 408 is lowered relative to initial ceiling 407. Initial ceiling 407 may be suitable for a constant Mach maneuver. However, if the airspeed decreases significantly during the intended maneuver, initial ceiling 407 may no longer be suitable for desirable safety. The change of initial ceiling 407 to current ceiling 408 can be performed when a situation such as inadvertent airspeed decay occurs in the aircraft. This change performed dynamically during flight of aircraft take into account changes in the state of aircraft such as airspeed.

The illustration of graph 400 is presented as one manner in which an operational flight envelope and three ceilings for operational flight envelope can be depicted. In other illustrative examples, the operational flight envelope and the three ceilings can be depicted using other parameters. For example, y-axis 406 can represent the coefficient of lift ($C_L$) instead of an angle attack.

Figure 5:
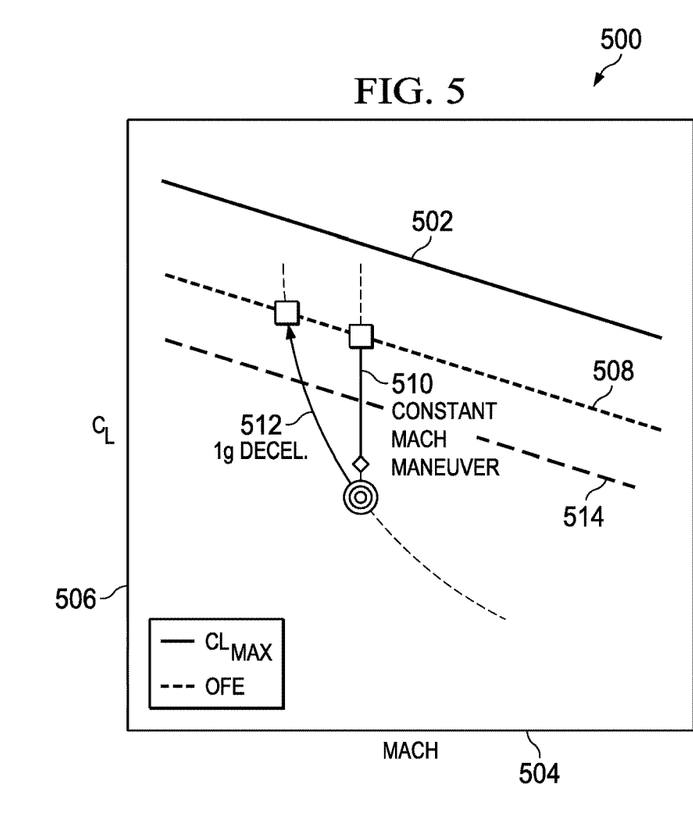
FIG. 5 is an illustration of a graph of an operational flight envelope with an initial ceiling for a constant Mach maneuver in accordance with an illustrative embodiment.

Turning to FIG. 5, an illustration of a graph of an operational flight envelope with an initial ceiling for a constant Mach maneuver is depicted in accordance with an illustrative embodiment. In this illustrative example, graph 500 illustrates an operational flight envelope, such as operational flight envelope 202 in FIG. 2.

In this illustrative example, maximum coefficient of lift ($CL_{MAX}$) curve 502 defines the maximum ceiling of the operational flight envelope. In this illustrative example, maximum coefficient of lift curve 502 defines the maximum coefficient of lift with respect to Mach on X axis 504 and coefficient of lift ($C_L$) on y-axis 506.

In this illustrative example, initial ceiling 508 is a ceiling of the operational flight envelope for a constant Mach maneuver. In this example, Mach is described by the airspeed divided by speed of sound. As depicted, the coefficient of lift as indicated by line 510 can change during the constant Mach maneuver.

However, a decrease in airspeed reduces the lift and requires an increased angle attack to sustain constant altitude at reduced airspeed such as a 1G deceleration as shown by line 512. As a result, a greater delay in reaching initial ceiling 508 results from the decreased airspeed.

Initial ceiling 508 can be adjusted to form current ceiling 514 taking into account changes in the airspeed of an aircraft. Current ceiling 514 can be used to change settings for at least one of a stick shaker setting, an angle attack limit, an automatic thrust trigger, or other settings being made to provide for earlier action that results in increased safety in performing the maneuver.

Figure 6:
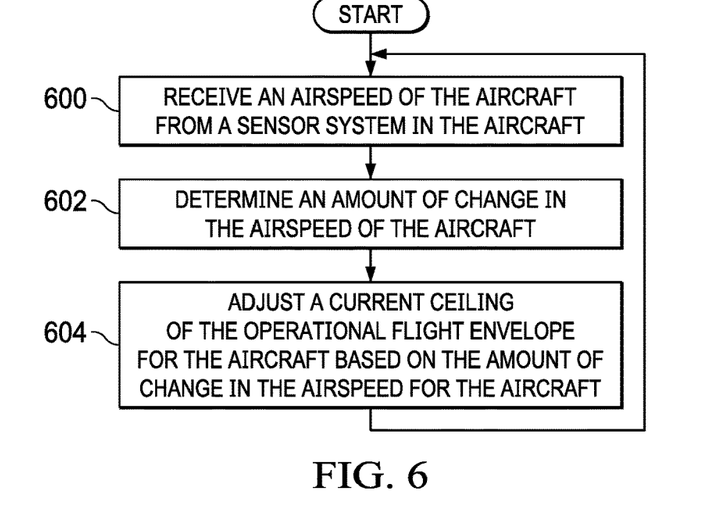
FIG. 6 is an illustration of a flowchart of a process for adjusting an operational flight envelope for an aircraft in accordance with an illustrative embodiment.

Turning next to FIG. 6, an illustration of a flowchart of a process for adjusting an operational flight envelope for an aircraft is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in controller 208 in computer system 206 in FIG. 2.

The process begins by receiving an airspeed of the aircraft from a sensor system in the aircraft (operation 600). The process determines an amount of change in the airspeed of the aircraft (operation 602). The process adjusts a current ceiling of the operational flight envelope for the aircraft based on the amount of change in the airspeed of the aircraft (operation 604). The process returns to operation 600. In operation 604, the adjustment can be a change to a current ceiling of the operational flight envelope.

The process in the flowchart depicted in FIG. 6 can be repeated any the number of times during the flight of aircraft. This process can be repeated to dynamically change the current ceiling of the operational flight envelope to take account changes in the state of the aircraft. In the depicted example, these changes in state can be changes in the airspeed of the aircraft. Further, the changes can be made considering a particular maneuver or other conditions or parameters with respect to the aircraft.

Figure 7:
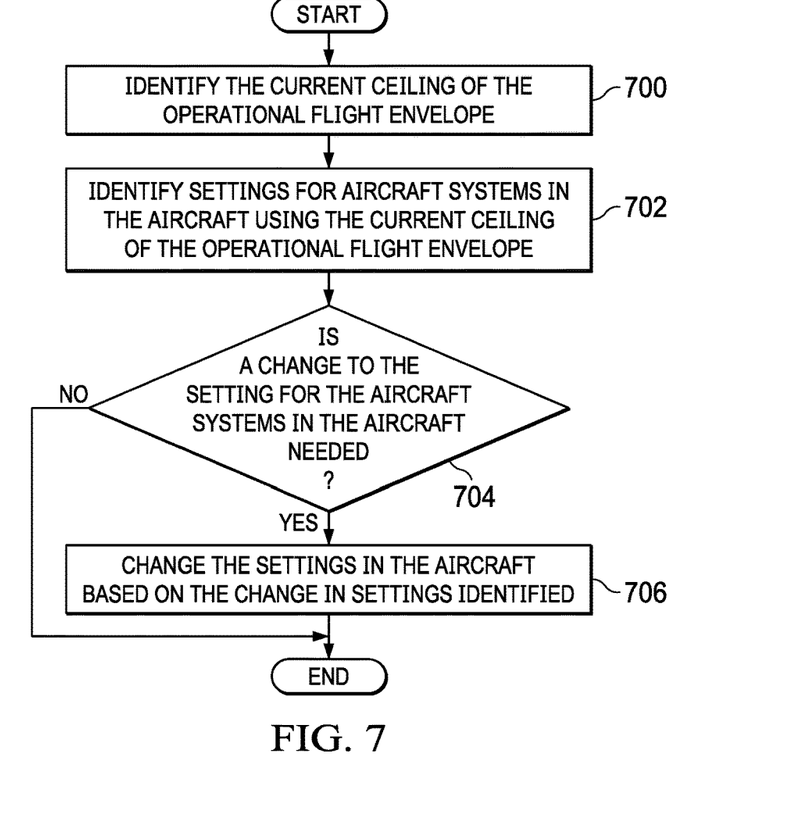
FIG. 7 is an illustration of a flowchart of a process for adjusting settings for aircraft systems in accordance with an illustrative embodiment.

With reference to FIG. 7, an illustration of a flowchart of a process for adjusting settings for aircraft systems is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in controller 208 in computer system 206 in FIG. 2 to control settings 224 for one or more of aircraft systems 226.

The process begins by identifying the current ceiling of the operational flight envelope (operation 700). Process identifies settings for aircraft systems in the aircraft using the current ceiling of the operational flight envelope (operation 702). In operation 702, the current ceiling can be used identify one or more settings for one or more of the aircraft systems in the aircraft.

A determination is made as to whether a change to the settings for the aircraft systems in the aircraft is needed (operation 704). The settings identified in operation 702 can be compared to the current settings to determine whether a change is needed from the current settings. If a difference is present between the current settings and the settings identified in operation 702, the change in settings is needed in operation 704. In operation 704, the change the settings can be for one or more settings for one or more aircraft systems.

The change in settings in operation 702 can be needed for one or more of the aircraft systems. For example, if the change in settings is to a stick shaker device in aircraft systems, stick shaker setting changes to cause the stick shaker device to activate when the current ceiling is reached rather than a prior initial ceiling of the operational flight envelope. As another example, when the settings include an automatic thrust trigger for an aircraft engine, the aircraft may automatically increase thrust sooner based on the change in the automatic thrust trigger when the current ceiling is lowered for the operational flight envelope. The automatic thrust trigger can be set earlier based on the change to the current ceiling of the operational flight envelope.

If a change is needed, the process changes the settings in the aircraft systems based on the change in settings identified (operation 706). The process terminates thereafter. With reference again to operation 704, if a change to the settings for the aircraft systems in the aircraft is absent, the process also terminates.

This process can be performed any number of times or can be performed continuously in which a zero change can occur in some cases when a system bias is not needed and a non-zero change can occur when a system bias is needed. The process can be initiated in response to a non-periodic event such as when the current ceiling of the operational flight envelope changes. The process can also be initiated in response to a periodic event such as the expiration of a timer. For example, timer can be set to expire every millisecond, second, after some of desired period of time.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
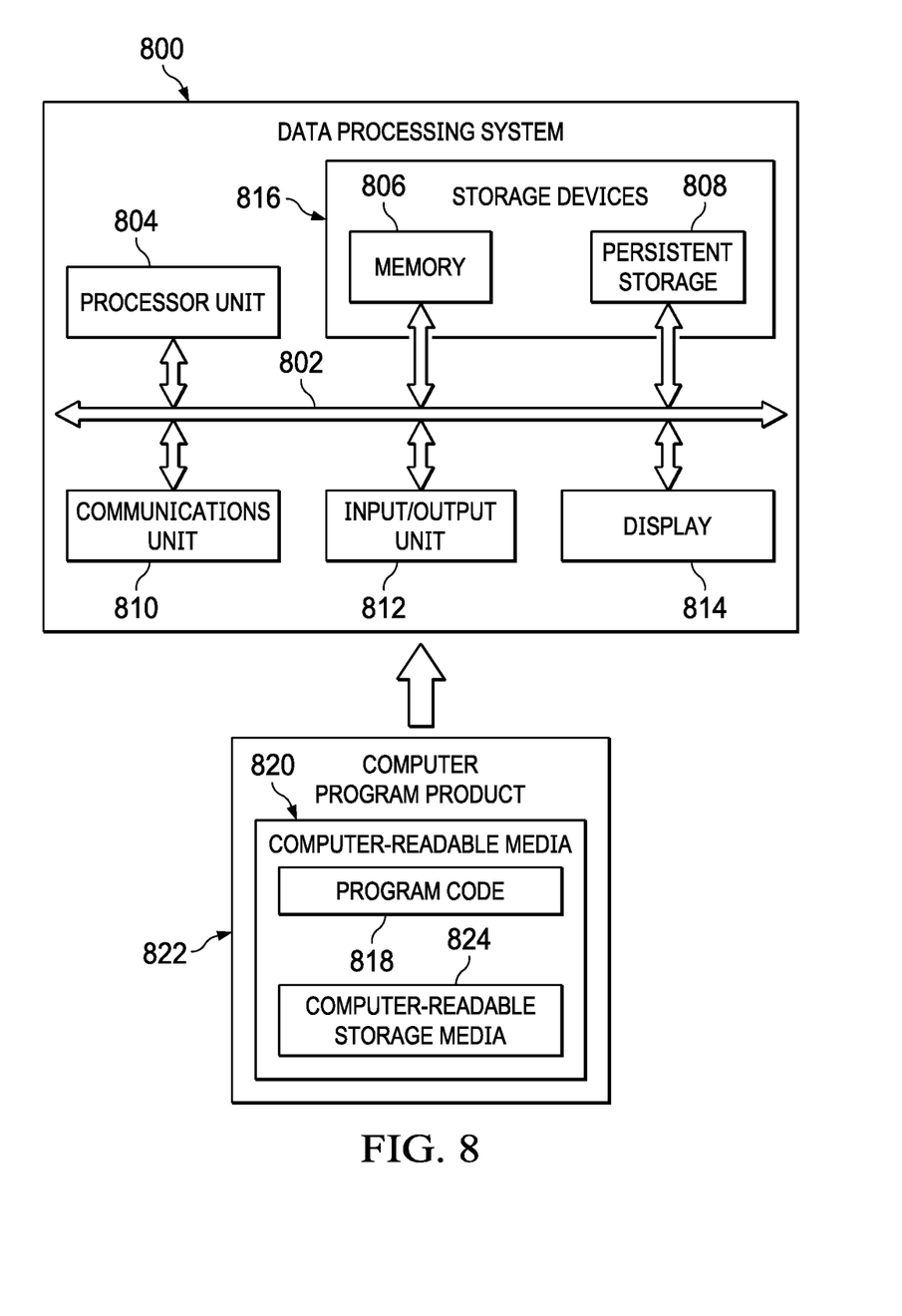
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 can be used to implement computer system 130 in FIG. 1 and computer system 206 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 can take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 can provide a connection for user input through at least one of a keyboard, a mouse, or some other suitable input device. Further, input/output unit 812 can send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which can be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, can be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Figure 9:
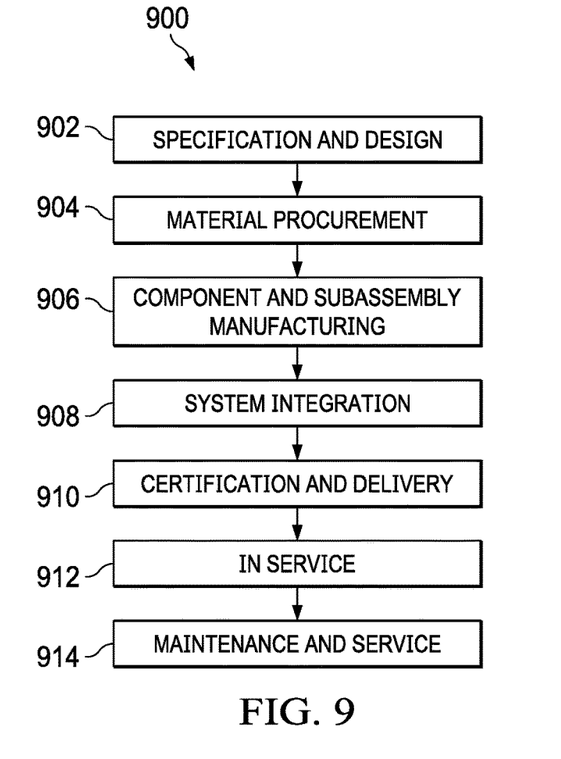
FIG. 9 is an illustration of an aircraft manufacturing and service method in accordance with an illustrative embodiment.
Figure 10:
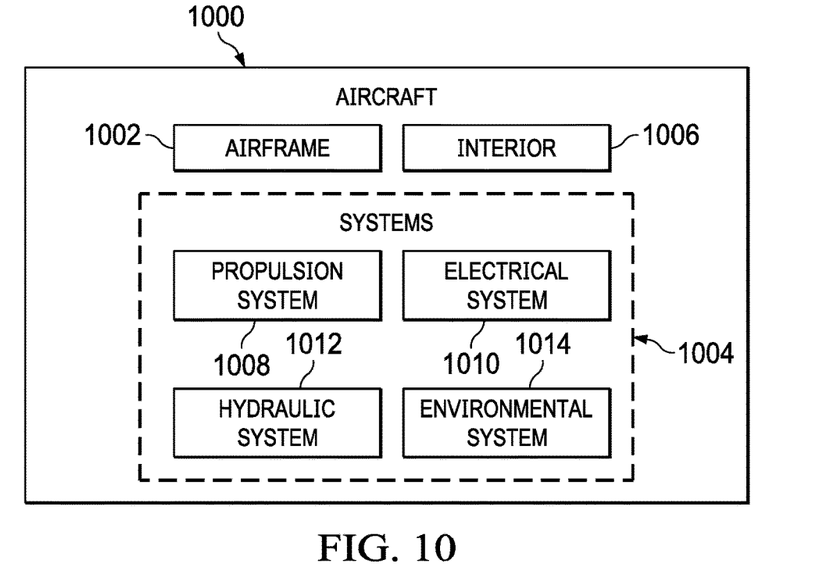
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During preproduction, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 can go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

In this illustrative example, computer system 206 with controller 208 in FIG. 2 can be implemented within electrical system 1010 in systems 1004 in aircraft 1000 to increase the performance of aircraft 1000 by increasing safety margins or maintaining a desired maneuver capability.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 can be fabricated or manufactured in a manner similar to components or subassemblies produced while aircraft 1000 is in service 912 in FIG. 9. As yet another example, one or more apparatus embodiments, method embodiments, or a combination thereof can be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both.

For example, hardware, software, or some combination thereof containing controller 208 in FIG. 2 can be added to aircraft 1000 during at least one of system integration 908 or maintenance and service 914. For example, controller 208 can be added during routine maintenance and service 914, which may include modification, reconfiguration, refurbishment, and other maintenance or service for aircraft 1000.

Controller 208 can operate during in service 912 of aircraft 1000 to dynamically change the current ceiling of the operational flight envelope for aircraft 1000 in manner that increases safety margins for operators of aircraft 1000.

The use of a number of the different illustrative embodiments may substantially expedite the assembly of aircraft 1000, reduce the cost of aircraft 1000, or both expedite the assembly of aircraft 1000 and reduce the cost of aircraft 1000.

The illustrative embodiments provide a method, apparatus, and aircraft system for dynamically adjusting a current ceiling of an operational flight envelope for an aircraft during flight of the aircraft. An airspeed of the aircraft is received from a sensor system in the aircraft. An amount of change in the airspeed of the aircraft is determined. A current ceiling of the operational flight envelope for the aircraft is adjusted based on the amount of change in the airspeed of the aircraft.

In the illustrative examples, the adjustment to the current ceiling can be performed dynamically in response to receiving information from a sensor system in which the information includes the airspeed of the aircraft. With the airspeed of aircraft, undesired changes or unanticipated changes in the airspeed can be detected and taken into account by biasing for adjusting current ceiling of the operational flight envelope for the aircraft. As result, settings such as a stick shaker setting, an angle of attack limit, an automatic thrust trigger, or other settings for safety mechanisms in the aircraft can be adjusted to increase the margin of safety for the aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft system that comprises
a computer system in an aircraft; and
a controller in the computer system configured to:
receive an airspeed of the aircraft from a sensor system in the aircraft;
determine an amount of change in the airspeed of the aircraft; and
adjust a system bias, scaled based on the amount of change in the airspeed of the aircraft, that changes an operational limit within an operational flight envelope for the aircraft defined by a maximum value for a parameter of the aircraft with a new operational limit for the parameter that defines the operational flight envelope.

2. The aircraft system of claim 1, wherein the controller is further configured to
adjust the system bias, scaled linearly based on the amount of change in the airspeed of the aircraft;
adjust the operational limit dynamically with the aircraft in flight; and
control an operation of the aircraft based upon the new operational limit.

3. The aircraft system of claim 2, further comprising the controller configured to:
adjust the system bias, scaled proportionately based on the amount of change in the airspeed of the aircraft; and
based upon the new operational limit, selectively adjust a group of settings for at least one of an engine or a flight control system in the aircraft.

4. The aircraft system of claim 3, further comprising the controller configured to, based upon the new operational limit, selectively adjust a group of settings for a stick shaker.

5. The aircraft system of claim 2, further comprising the controller configured to set at least one of: an automatic thrust trigger, a stick shaker setting, or an angle of attack limit based upon the new operational limit.

6. The aircraft system of claim 1, further comprising the controller configured to determine a magnitude of the amount of change in the airspeed of the aircraft based upon the airspeed of the aircraft and a target airspeed for the aircraft.

7. The aircraft system of claim 1, further comprising the controller configured to determine that an adjustment to the new operational limit is needed when the airspeed decreases below a selected Mach, wherein the selected Mach is a ratio of a target airspeed to a speed of sound.

8. The aircraft system of claim 1, further comprising an activation logic in the controller configured to determine the amount of change in the airspeed of the aircraft and a settings adjuster in the controller configured to adjust the new operational limit for the aircraft based on the amount of change in the airspeed of the aircraft.

9. The aircraft system of claim 1, further comprising the controller configured to formulate the new operational limit such that a desired level of maneuver capability of the aircraft exists at a target airspeed.

10. The aircraft system of claim 1, wherein the operational flight envelope defines a threshold for the parameter selected from one of: an angle of attack, or a coefficient of lift.

11. The aircraft system of claim 1, further comprising the controller configured to receive at least one of: a flap configuration, an angle of attack, or a lift coefficient from the sensor system in the aircraft.

12. The aircraft system of claim 1, further comprising the controller configured to run in a computer, in the computer system, selected from a group comprising: a crew alerting system, or a stall warning system.

13. The aircraft system of claim 1, wherein the amount of change in the airspeed of the aircraft comprises a decay in the airspeed of the aircraft.

14. An aircraft system that comprises:
a computer system in an aircraft configured to:
determine an amount of change in an airspeed of the aircraft;
adjust a system bias, scaled based on the amount of change in the airspeed of the aircraft, that changes an initial adjustment within an operational flight envelope, defined by a maximum value for a parameter, for the aircraft to form an adjusted operational flight envelope for the parameter that defines the operational flight envelope; and
adjust a group of settings used by a group of aircraft systems in the aircraft based the adjusted operational flight envelope.

15. The aircraft system of claim 14, wherein the computer system is further configured to:
adjust the system bias, scaled linearly based on the amount of change in the airspeed of the aircraft; and
dynamically adjust the initial adjustment.

16. The aircraft system of claim 14, wherein the group of aircraft systems is selected from at least one of a stall warning system, an angle of attack limit, or a crew alerting system.

17. A method for adjusting an operational flight envelope for an aircraft, the method comprising:
receiving, by a computer system in the aircraft, an airspeed of the aircraft from a sensor system in the aircraft;
determining, by the computer system, an amount of change in the airspeed of the aircraft; and
adjusting, by the computer system using a system bias, scaled on the amount of change in the airspeed of the aircraft, an operational limit within the operational flight envelope for the aircraft defined by a maximum value for a parameter of the aircraft, and forming a new operational limit for the parameter defining the operational flight envelope.

18. The method of claim 17 further comprising:
adjusting the system bias, scaled linearly based on the amount of change in the airspeed of the aircraft; and
controlling, by the computer system using the new operational limit, an operation of the aircraft.

19. The method of claim 18, further comprising:
adjusting the system bias, scaled proportionately based on the amount of change in the airspeed of the aircraft; and
selectively adjusting, by the computer system using the new operational limit, a group of settings for a group of aircraft systems in the aircraft.

20. The method of claim 19, wherein the group of aircraft systems comprises a stall warning system.

21. The method of claim 18, wherein controlling, by the computer system, the operation of the aircraft using the new operational limit comprises setting, by the computer system using the new operational limit to control operation of the aircraft, at least one of: an automatic thrust trigger, a stick shaker setting, or an angle of attack limit.

22. The method of claim 17, wherein determining, by the computer system, the amount of change in the airspeed of the aircraft comprises determining, by the computer system:
   a magnitude of the amount of change in the airspeed of the aircraft using the airspeed of the aircraft; and
   a target airspeed for the aircraft.

23. The method of claim 17 further comprising: determining, by the computer system, an adjustment to the new operational limit is needed when the airspeed decreases below a selected Mach, wherein the selected Mach is a ratio of a target airspeed to a speed of sound.

24. The method of claim 17, further comprising:
   determining, by an activation logic in the computer system, the amount of change in the airspeed of the aircraft; and
   adjusting, by a settings adjuster in the computer system, the new operational limit for the aircraft based on the amount of change in the airspeed of the aircraft.

25. The method of claim 17 further comprising: selecting, by the computer system, the new operational limit maintaining a desired level of maneuver capability for the aircraft at a target airspeed.

26. The method of claim 17, wherein the parameter defining the operational flight envelope is selected from one of: an angle of attack, or a coefficient of lift.

27. The method of claim 17 further comprising: receiving, by the computer system, at least one of: a flap configuration, angle of attack, or lift coefficient from the sensor system in the aircraft.

28. The method of claim 17, further comprising the computer system being selected from a group comprising: a crew alerting system, or a stall warning system in the computer system.

29. The method of claim 17, wherein the amount of change in the airspeed of the aircraft comprises a decay in the airspeed of the aircraft.

* * * * *